United States Patent

[11] 3,592,547

[72] Inventor Milton L. Noble
Liverpool, N.Y.
[21] Appl. No. 713,218
[22] Filed Mar. 14, 1968
[45] Patented July 13, 1971
[73] Assignee General Electric Company

[54] OPTICAL MATRIX-PROCESSING SYSTEM AND OPTICS
4 Claims, 7 Drawing Figs.

[52] U.S. Cl. .......... 356/71, 235/181, 350/162
[51] Int. Cl. .......... G06k 9/08
[50] Field of Search .......... 356/71; 350/162; 235/181

[56] References Cited

UNITED STATES PATENTS

| | | | |
|---|---|---|---|
| 3,317,267 | 5/1967 | Offner | 350/181 |
| 3,365,579 | 1/1968 | Emshwiller | 350/162 X |
| 3,390,257 | 6/1968 | Lohmann | 356/71 X |
| 3,397,605 | 8/1968 | Brueggemann | 350/162 X |
| 3,418,626 | 12/1968 | Farr et al. | 356/71 X |

OTHER REFERENCES

IBM TECHNICAL DISCLOSURE BULLETIN V. 6, No. 1, June 1963, p. 131, [ 350/(OSR)].

*Primary Examiner*—Ronald L. Wibert
*Assistant Examiner*—Warren A. Sklar
*Attorneys*—Marvin A. Goldenberg, Richard V. Lang, Frank L. Neuhauser, Oscar B. Waddell and Melvin M. Goldenberg

ABSTRACT: An optical processing system which performs a general matrix transformation. Analog data to be transformed is entered as a first set of inputs written upon a first writing medium in the form of diffraction-grating lines in a column arrangement of a plurality of resolution elements. The matrix transform function is entered as a second set of inputs written as diffraction-grating lines on a second writing medium in a column, row arrangement of resolution elements. With respect to said first and second sets of inputs, magnitude information is contained in the transmissivity of the resolution elements, and phase information may be contained in the spatial frequency of the grating lines. A matrix processing of said first set of inputs by said second set of inputs is optically performed by imaging spatially filtered light from individual resolution elements of the first medium upon corresponding rows of resolution elements of the second medium by means of a first anamorphic telecentric lens arrangement, and by imaging spatially filtered light from the resolution elements of the second medium as a single row of resolution elements in an output image plane by means of a second anamorphic telecentric lens arrangement.

INVENTOR:
MILTON L. NOBLE,
BY Marvin L. Goldenberg
HIS ATTORNEY.

INVENTOR:
MILTON L. NOBLE,
BY Marvin L. Goldenberg
HIS ATTORNEY.

INVENTOR:
MILTON L. NOBLE,

BY [signature]
HIS ATTORNEY.

OPTICAL MATRIX-PROCESSING SYSTEM AND OPTICS

The invention herein described was made in the course of a contract with the United States Air Force.

BACKGROUND OF THE INVENTION:

1. Field of the Invention

The invention relates generally to the field of optical analog information-processing systems, and more particularly to optical systems which employ a noncoherent form of optics. A specific feature of the invention pertains further to the field of special purpose optical lenses, in particular anamorphic lens assemblies.

2. Description of the Prior Art

Optical information processors offer a number of advantages over electronic and mechanical systems, the most outstanding of which is the ability to process large quantities of information in a direct and efficient manner. However, because optical systems have a rigid physical structure, they cannot be readily adapted to perform complex and intricate data processing operations, such as performed by electronic data processing systems. One such operation is a matrix transformation which requires the performance of a large number of discrete mathematical steps. There is not known to exist an optical system having the capability for providing directly a matrix transformation.

Further, anamorphic lens assemblies are found in the art with but small magnification ratios, e.g., not commonly exceeding a 2-to1 ratio. Lenses having relatively large ratios, e.g., on the order of 100 to 1, which are desirable for use in the present matrix-processing system, are unknown.

Accordingly, it is a principal object of the invention to provide a novel optical information-processing system which is capable of performing a matrix transformation upon a set of analog input data.

It is a further object of the invention to provide an optical information-processing system as described wherein the matrix transformation proceeds as a number of simultaneous parallel operations. It is still a further object of the invention to provide a system as described wherein coherent as well as noncoherent data can be processed.

It is another object of the invention to provide an optical information-processing system as described which employs simply constructed and relatively inexpensive optical components.

Still a further object of the invention is to provide a novel, high quality anamorphic lens assembly suitable for use in the present system.

Another object of the invention is to provide a novel anamorphic lens assembly exhibiting large anamorphic ratios, low distortion and uniform illumination.

These and other objects of the invention are accomplished by an optical matrix-processing system having a first light modulating writing medium upon which a first set of inputs to be operated upon are entered in the form of a single column of resolution elements. A second set of inputs providing the matrix transformation is entered upon a second spaced apart light modulating writing medium as a row and column arrangement of resolution elements, wherein for each resolution element of said first medium there is a corresponding row of resolution elements at said second medium. Information is written upon the resolution elements of said first and second writing media for providing an intensity modulation of light transmitted therethrough as a function of the applied data magnitude. A first anamorphic lens assembly images the modulated light from each resolution element of the first medium upon the corresponding row of resolution elements of the second writing medium. Light transmitted from the resolution elements of said second medium represents a plurality of products of said first inputs each taken with a row of said second matrix transform inputs. A second anamorphic lens assembly images the light transmitted from said second writing medium as a row of output resolution elements upon an output image plane, wherein each output resolution element is illuminated by the light from a column of resolution elements of said second writing medium. The light at the output resolution elements therefore represents integrated products from which the individual output quantities of the matrix transformation process can be derived. The outputs may be put in the form of electrical signals by providing photosensitive means responsive to the light at said output resolution elements.

In accordance with one specific aspect of the invention, the anamorphic lens assemblies each include a telecentric lens arrangement comprising a pair of spherical lenses providing unity magnification in a first dimension and further comprising cylindrical lens elements having optical properties and being so positioned as to alter the magnification in a second orthogonal dimension while maintaining a telecentric configuration in both dimensions.

In accordance with a further aspect of the invention, coherent data may be processed providing phase information in addition to magnitude information wherein data is entered upon said first and second writing media in the form of several diffraction-grating lines per resolution element, the spatial frequency of said grating lines being a function of the phase of the input data. The modulated light from said first and second writing media is spatially filtered to preserve both magnitude and phase information.

BRIEF DESCRIPTION OF THE DRAWING

The specification concludes with claims particularly pointing out and distinctly claiming the subject matter which is regarded as the invention. It is believed, however, that both as to its organization and method of operation, together with further objects and advantages thereof, the invention may be best understood from the description of the preferred embodiments, taken in connection with the accompanying drawings in which:

FIG. 3B is an optical schematic diagram, in plan view, of the first section of FIG. 2;

DESCRIPTION OF THE PREFERRED EMBODIMENTS

The operation optically performed by the present invention, and functionally depicted in FIG. 1, may be mathematically expressed in the following manner in accordance with conventional matrix transformation notation:

$$x(\beta_1),\ x(\beta_2),\ \cdots\ x(\beta_n)\begin{bmatrix} A(\alpha_1,\beta_1), & \cdots & A(\alpha_1,\beta_n) \\ \cdots & \cdots & \cdots \\ \cdots & \cdots & \cdots \\ A(\alpha_n,\beta_1), & \cdots & A(\alpha_n,\alpha_n) \end{bmatrix} = \begin{bmatrix} y(\alpha_1) \\ y(\alpha_2) \\ \vdots \\ y(\alpha_n) \end{bmatrix} \quad (1)$$

where $x(\beta_1)$, etc., are a set of input data to be operated upon; $A(\alpha_1,\beta_1)$ etc., are the matrix transform function; and $y(\alpha_1)$, etc., are the output quantities resulting from the matrix transformation. As is well known, in performing a matrix transformation successive products are taken of individual input quantities with rows of the matrix transform quantities and these products summed along the columns of the matrix transform for providing the output quantities.

Figure 1:
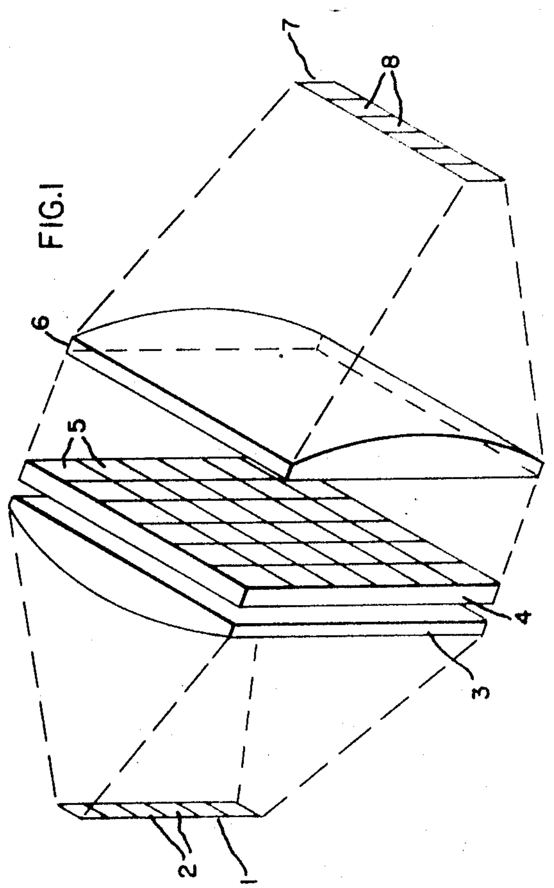
FIG. 1 is a functional diagram, in perspective view, of the optics employed for performing a matrix transformation of input data, in accordance with the invention.

Referring to FIG. 1, there is illustrated a functional diagram of the optical structure employed in accordance with the invention for performing a matrix transformation. The input data is entered at a first input plane 1 in the form of discrete resolution elements 2 arranged in a column. Light projected through the input plane 1 is modulated in intensity as a function of data applied to the resolution elements 2. By means of a first anamorphic lens 3 the modulated light is imaged upon a second input plane 4 having a column, row arrangement of resolution elements 5 of the same dimensions as elements 2, upon which the matrix transform data is entered. The resolution elements 5 further intensity modulate the light as a function of the matrix transformation data.

The anamorphic lens 3 has optical properties for providing unity magnification in a first dimension, along the columns, and a multiple magnification in a second orthogonal dimension, along the rows. Thus, light from each resolution element 2 of the input plane is imaged upon a corresponding row of resolution elements 5 of the matrix plane 4. Light transmitted through each of the resolution elements 5 provides the product of the data entered there with the data entered upon a single corresponding resolution element 2.

A second anamorphic lens 6 images the light from the matrix plane 4 onto an output plane 7 in the form of a row of output resolution elements 8. Anamorphic lens 6 provides unity magnification in said second dimensions and a multiple demagnification in said first dimension. The light from each output resolution element 8 therefore provides an integration of the products represented by light from the corresponding column of resolution elements 5. Hence a matrix transformation is obtained.

Figure 2:
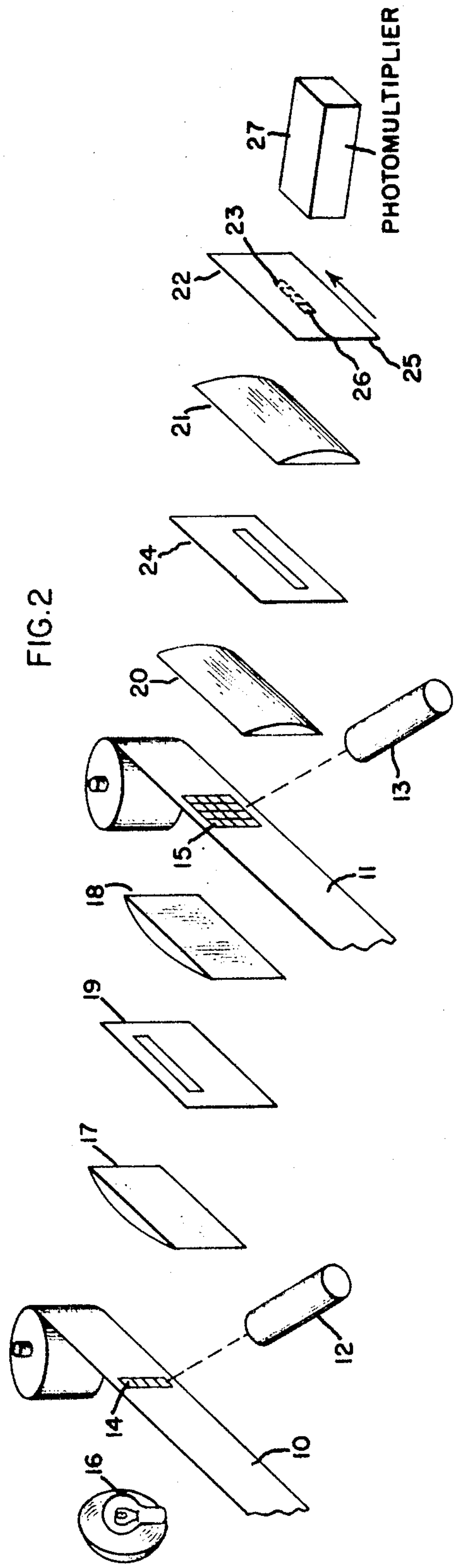
FIG. 2 is a schematic diagram in perspective view of an optical analog matrix-processing system.

In FIG. 2 there is schematically illustrated an optical system for implementing the matrix transformation function described with respect to FIG. 1. FIG. 2 is a perspective view schematically illustrating the present structure wherein a set of input data written upon a first writing medium 10 is transformed by matrix transform data applied to a second writing medium 11.

A number of different light modulating writing media may be employed including a deformable type, such as a thermoplastic or oil film, or a density modulated type, such as a photographic film. The method for entering data is not critical. In the embodiment under consideration a thermoplastic film is employed for the media 10 and 11 written upon by an electron gun 12 and 13, respectively. Analog data is written upon individual resolution elements in the form of diffraction grating lines, there being several grating lines of fixed spatial frequency per resolution element. The magnitude of the information is in accordance with the depth of the impressed grooves, in a conventional manner. Data is written upon medium 10 in the form of a column of resolution elements 14, and upon medium 11 in the form of a column, row arrangement of resolution elements 15. For purposes of illustration only a limited number of resolution elements are shown.

Light energy from a conventional source 16 is projected through medium 10 and modulated at each resolution element 14 in accordance with the magnitude of said first input data. A first anamorphic lens assembly, schematically represented by cylindrical lens elements 17 and 18, images light from the column of resolution elements 14 of medium 10 upon the rectangular array of resolution elements 15 at the writing medium 11. Each resolution element 14 is imaged upon a corresponding row of resolution elements 15. The first anamorphic lens assembly provides unity magnification in a first dimension along the columns, and a multiple magnification in a second dimension along the rows, the magnification factor being equal to the ratio of a row of resolution elements 15 to the width of a single-resolution element 14. A magnification factor of 100 has been employed in one operable embodiment.

A spatial filter 19 located in the spatial frequency plane between lens elements 17 and 18 passes the higher order components of diffracted light and blocks the zero order, so as to effect an intensity modulation of the transmitted light in accordance with the diffraction provided by the resolution elements 14. Light incident at each row of resolution elements 15 is thus modulated in intensity as a function of the data applied to corresponding single-resolution elements 14, the light being further modulated in intensity upon being transmitted through each resolution element 15. Accordingly, light from resolution elements 15 represents numerous products of the first and second input data.

A second anamorphic lens assembly, schematically shown by cylindrical lens elements 20 and 21, images the light from resolution elements 15 onto an output plane 22 as a row of output resolution elements 23, whereby the light from each column of resolution elements 15 is imaged upon a single corresponding resolution element 23. A spatial filter 24 located in the spatial frequency plane between lens elements 20 and 21 passes the higher order light components and blocks the zero order light components of the light from medium 11 to provide an intensity modulation of the diffracted light. Anamorphic lens elements 20 and 21 provide a unity magnification in the second dimension and a multiple demagnification in the first dimension. The demagnification factor is equal to the ratio of the height of an output resolution element 23 to a column of resolution elements 15, in the present embodiment being equal to the magnification factor of the first section of the system. Accordingly, light imaged upon output resolution elements 23 provides integrated products of data from corresponding columns of elements 15. A spatial filter 25 having an aperture 26 scans the output plane and passes light energy from single-output resolution elements 23. A photomultiplier 27 responds to light transmitted through aperture 26 so as to provide the integrated product quantities of the matrix transformation.

It is noted that if density modulated writing media are employed the spatial filters 19 and 24 are omitted.

Figure 3A:
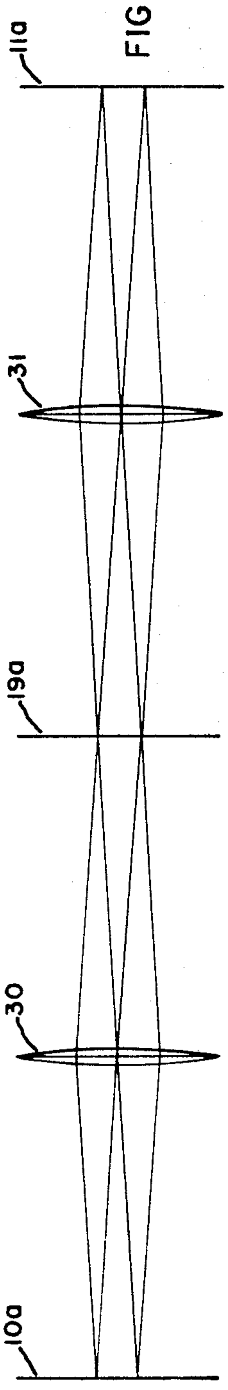
FIG. 3A is an optical schematic diagram, in side view, of a first section of the system of FIG. 2.

FIGS. 3A and 3B are optical schematic diagrams, in side and plan views, respectively, of the first section of the system of FIG. 2 in which an anamorphic magnification is provided. Components similar to those of FIG. 2 are identified by the same reference characters, but with an added *a* subscript. The anamorphic lens assembly, schematically presented as a pair of cylindrical lens elements in FIG. 2, are in sufficient detail in FIGS. 3A and 3B to illustrate the principles of operation. In order to indicate with clarity construction lines for the transmitted light components in FIG. 3A, the scale for this Figure is made many times larger than that of FIG. 3B.

As indicated by the light components A in the diagram of FIG. 3A, a unity magnification between the plane of the first writing medium $10_a$ and the second writing medium $11_a$ is provided by a pair of holosymmetric telecentric lens elements 30 and 31. In accordance with a holosymmetric telecentric configuration, lens elements 30 and 31 have identical focal lengths $f_1$ and are spaced by $f_1$ from the writing media $10_a$ and $11_a$, respectively, and by $2f_1$ from each other. Lens elements 30 and 31 are spherical. In one operable embodiment Super Baltar lenses were employed, although numerous commercial lenses would be suitable. Spatial filter $19_a$ is located at spatial frequency plane *g* midway between lens elements 30 and 31.

In the plan view of FIG. 3B cylindrical lens elements 32, 33, 34 and 35 are introduced for providing a magnification of the light in said second dimension, as indicated by light components B. These elements have zero power and are not effective in the first dimension, and therefore do not appear in the diagram of FIG. 3A. In FIG. 3B, a two step magnification is provided, which is relatively convenient for the present application. However, it should be understood that a single step or multiple steps greater than two can be employed without departing from the basic principles herein set forth.

The first cylindrical element 32 has a focal length $f_2$, where $f_2 << f_1$. Lens 32 is spaced by $f_2$ from medium $10_a$ to provide a spatial frequency plane at *h*, also at the focal length. Cylindrical lens element 33 forms a composite lens with lens 30 having a modified focal length $f_1'$ and shifts the principal axis of lens 30 so that the composite lens has an effective principal axis positioned at a plane *i*, which is spaced by the focal length $f_1'$ from both planes *g* and *h*. There is thus obtained a hemisymmetric telecentric arrangement with lens element 32, since $f_1' \neq f_2$ and a first step magnification from the plane at medium $10_a$ to plane *g* equal to the ratio $f_1'/f_2$.

A second step magnification is provided from plane *g* to the second writing medium $11_a$ by third and fourth cylindrical lens elements 34 and 35 in combination with spherical lens 31. Lens element 34 has a focal length $f_2$ and is spaced by $f_2$ from plane *g* to provide a spatial frequency plane at *j*. Element 35 forms a composite lens with spherical lens 31, which as with respect to lens elements 30, 33, has a modified focal length $f_1'$ and an effective principal axis positioned at a plane *k* spaced by $f_1'$ from both plane *j* and the plane of writing medium $11_a$. The second step magnification is equal to the ratio $f_1'/f_2$, the total magnification being $(f_1'/f_2)^2$.

Figure 4A:
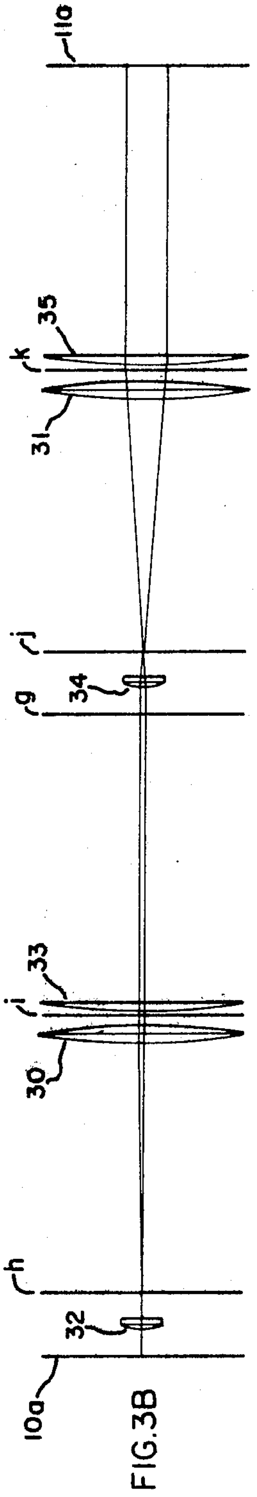
FIG. 4A is an optical schematic diagram, in side view, of the second section of the system of FIG. 2.
Figure 4A:
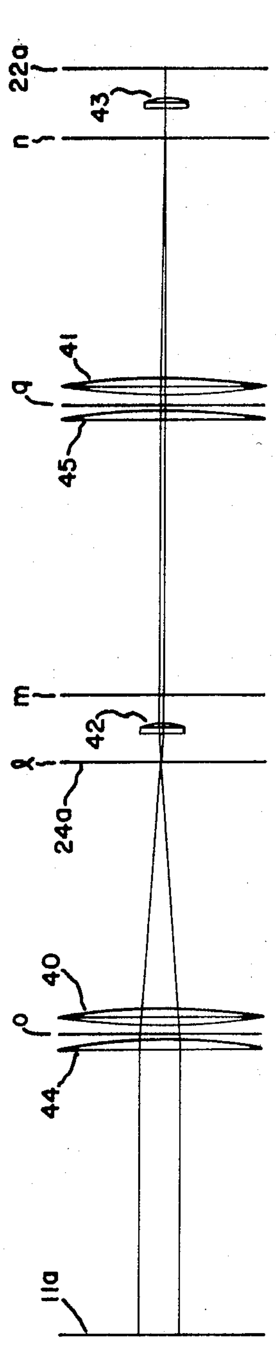
Figure 4B:
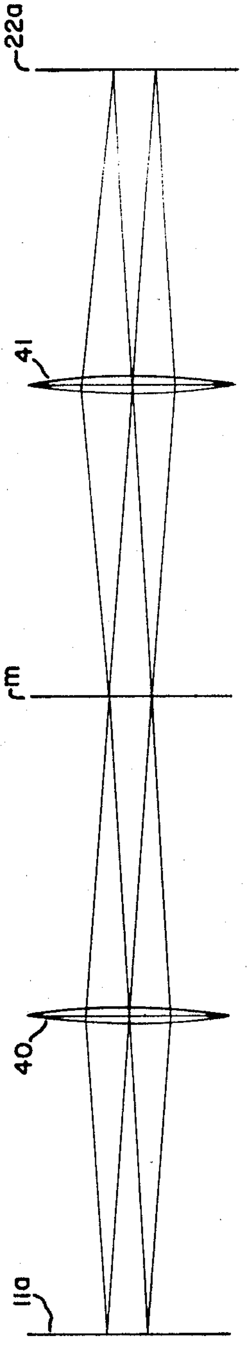
FIG. 4B is an optical schematic diagram, in plan view, of the second section of FIG. 2.

FIGS. 4A and 4B are optical schematic diagrams, in side and plan views, respectively, of the section of the system of FIG. 2 in which an anamorphic demagnification is provided. The structure of FIG. 4B is analogous to that of FIG. 3A and provides, in the manner previously described, unity magnification between the plane of second writing medium $11_a$ and the output plane $22_a$ by means of holosymmetric telecentric lens elements 40 and 41.

The structure in FIG. 4A, except for the spatial filter $24_a$ at plane *l*, exhibits an exact mirror symmetry with the structure of FIG. 3B, and provides a two step demagnification of light in said first dimension between the plane of medium $11_a$ and output plane $22_a$, which is inverse to the magnification provided in FIG. 3B with respect to light in said second dimension. Accordingly, there are provided a pair of cylindrical lens elements 42 and 43 each of focal length $f_2$, and cylindrical lens element 44 and 45 forming a pair of composite lenses with spherical lens elements 40 and 41, respectively, where each composite lens has a modified focal length of $f_1'$. Lens element 42 is spaced by its focal length $f_2$ from spatial frequency plane *l* and from plane *m*, plane *m* being an image plane in FIG. 4A and a spatial frequency plane in FIG. 4B. Lens element 43 is spaced by its focal length $f_2$ from spatial frequency plane *n* and from the output image plane $22_a$. Composite lens 40, 44 has an effective principal axis at plane *o* spaced by focal length $f_1'$ from the plane of writing medium $11_a$ and plane *l*. Composite lens 41, 45 has an effective principal axis at plane *q* spaced by $f_1'$ from planes *m* and *n*. Accordingly, for each step of demagnification there is provided a hemisymmetric telecentric lens configuration having a demagnification factor of $f_2/f_1'$.

For purposes of simplicity the lens structures thus far considered have been treated as flat lenses having a single principal axis. In practice, each lens element has a pair of principal axis, which for relatively thin lens constructions may be considered to exist at a single plane. However, for thick lens or complex lens constructions at a single plane. However, for thick lens or complex lens constructions the principal axes are at distinctly separate planes which must be considered when locating these lenses within the optical system.

Figure 5:
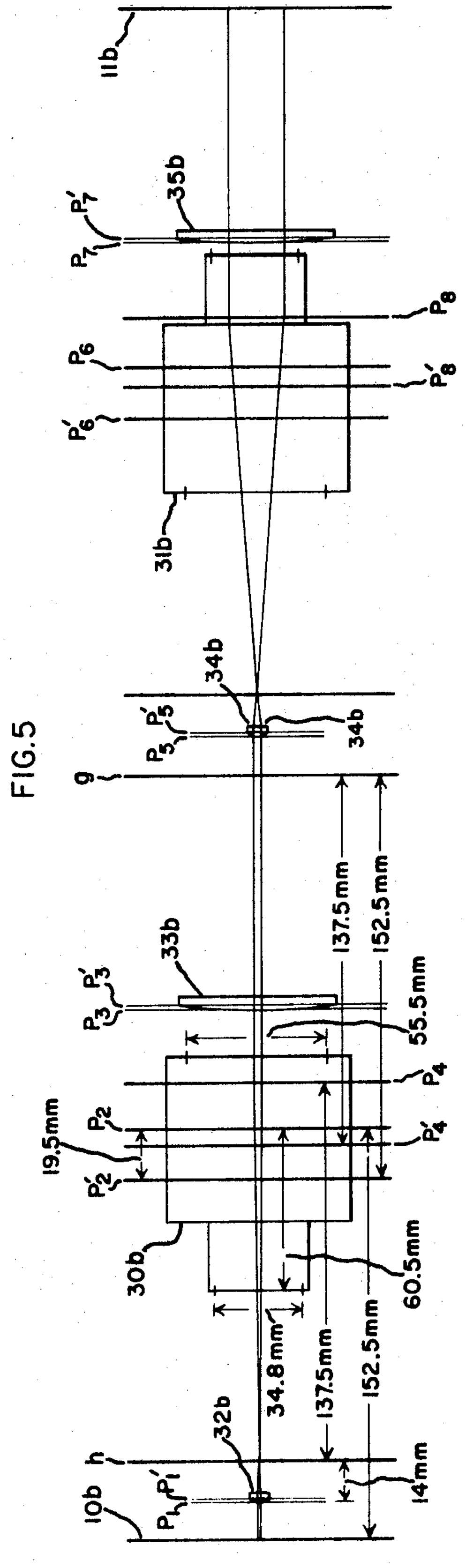
FIG. 5 is an enlarged side view of the lens structures employed in the first section of FIGS. 3A and 3B.

In FIG. 5 there is illustrated a side view of a specific lens structure comprising an anamorphic lens assembly that may be employed in the system of FIG. 2. There is shown structure providing a magnification corresponding to the first section of FIGS. 3A and 3B, comparable structure corresponding to the second section of FIGS. 4A and 4B. Similar reference characters are used in FIG. 5 to identify similar components in FIGS. 3A and 3B, but with a *b* subscript. The lens specifications presented are given by way of example and are not to be construed as limiting.

Accordingly, cylindrical lens element $32_b$ is shown as having first and second principal axes $p_1$ and $p_1'$ closely spaced together and located from the plane of writing medium $10_b$ and plane *h* by its focal length, in this instance 14 mm. Lens element $30_b$ is a 6 inch, F/2.8 Super-Baltar projection lens, having a front lens opening 34.8 mm. and a rear lens opening of 55.5 mm., with first and second principal axes $p_2$ and $p_2'$, respectively, spaced apart by 19.5 mm. The first principal axis $p_2$ is 60.5 mm. from the front lens surface and 152.5 mm., the original focal length, from medium $10_b$. The second principal axis $p_2'$ is 46.5 mm. from the rear lens surface and 152.5 mm. from plane *g*. Cylindrical lens element $33_b$, having closely spaced principal axes $p_3$ and $p_3'$, is positioned adjacent to lens element $30_b$ so as to shift its principal axes $p_2$ and $p_2'$ to planes $p_4$ and $p_4'$, respectively. The principal axis $p_4$ is 137.5 mm., the modified focal length, from plane *h*, and $p_4'$ is 137.5 mm. from plane *g*.

Equivalent construction and dimensions exist in the second step magnification with respect to lens element $34_b$ having principal axes $p_5$ and $p_5'$, lens element $31_b$ having principal axes $p_6$ and $p_6'$ and lens element $35_b$ having principal axes $p_7$ and $p_7'$. Lens $35_b$ shifts the principal axes $p_6$ and $p_6'$ of lens $31_b$ to planes $p_8$ and $p_8'$. Lens element $31_b$ is shown in an inverted relationship with respect to lens $30_b$ to maintain symmetry of the telecentric arrangement.

Thus far, a noncoherent processing of data has been considered. With slight modification, the present matrix-processing optical system may also be used for complex or coherent processing, i.e., for processing phase information in addition to magnitude information. In coherent processing, each piece of data to be entered into the system may be mathematically expressed as a vector quantity in the simplified exponential form $Ae^{i\phi}$, A being the magnitude and $e^{i\phi}$ the phase. The processing of a pair of data inputs may be expressed by the following equation:

$$[A_1e^{i\phi_1}][A_2e^{i\phi_2}]=[A_1A_2][e^{i(\phi_1+i\phi_2)}] \qquad (2)$$

In order to accomplish processing of phase information, each piece of data is applied in the form of several diffraction grating lines per resolution element where the phase information is contained in the spatial frequency of the lines. Accordingly, the angle of diffracted light becomes a function of the phase information of the applied data.

Referring to FIG. 2, with both magnitude and phase information applied to the resolution elements 14 and 15 of writing media 10 and 11, the light components passed by spatial filter 19 will include both components of information. The phase information, represented by the angle of the diffracted light, adds at the output of the second writing medium 11. The light components passed by filter 24 will therefore include the product of the magnitudes and sums of the phases for each pair of data pieces processed. A further spatial filtering function at a spatial frequency plane formed at the output side of output plane 22 can be performed for recovering both phase and magnitude information from the product outputs.

For a further description of coherent data processing in an optical system, reference is made to application for U.S. Letters Patent entitled "Complex Data Processing System Employing Incoherent Optics," filed concurrently with the present application.

It should be appreciated that the anamorphic lens structure specifically described herein may be modified in a number of respects without exceeding the basic teachings set forth. For example, a single-step magnification and demagnification may be employed where two steps are used in the present embodiment. For such operation, a single pair of cylindrical lens elements may be employed in each section for modifying the focal lengths and principal axis of the spherical lenses of the section to provide a hemisymmetric telecentric configuration. Correspondingly, a multiple step operation greater than two may be employed. Further, in lieu of a unity magnification in a single dimension, there could readily be effected various combinations of magnification and demagnification with respect to both dimensions.

In addition, the present system may be modified in provide a direct imaging of the light from the second writing medium, thereby employing anamorphic imaging in only the first section.

It is noted that anamorphic lens assemblies of the type described have a more general application than specifically provided with respect to the instant matrix processing system. Accordingly, the present lens assemblies may be gainfully employed in numerous applications requiring some form of anamorphic imaging, in particular where relatively large anamorphic ratios are sought. The appended claims are intended to be construed as embracing all modifications and variations of the system and structure herein disclosed which reasonably may be said to fall within the true scope of the invention.

I claim:

1. An optical information-processing system for providing matrix transformation comprising:

a. a source of light energy, b. a first light-modulating medium including a first plurality of resolution elements arranged in a column configuration for modulating light from said source as a function of a first input data, and positioned in a plane c. A second light-modulating medium including a second plurality of resolution elements arranged in a column, row configuration for modulating light as a function of a second input data providing the matrix transform function and positioned in a plane.

d. A first anamorphic lens assembly for imaging the light transmitted by individual resolution elements of said first plurality upon corresponding rows of resolution elements of said second plurality whereby the light transmitted by said second plurality corresponds to multiple products of said first and second data, said first anamorphic lens assembly having unity magnification in a first dimension along the columns of said second plurality of resolution elements by means of a first pair of like first and second spherical lens elements in a holosymmetric configuration and having a multiple magnification in a second orthogonal dimension along the rows of said second plurality of resolution elements by means of a first plurality of cylindrical lens elements acting in combination with said first pair of first and second spherical lens elements, e. a second anamorphic lens assembly for imaging the light transmitted by columns of said second plurality of resolution elements upon an output plane in the form of a row of output resolution elements said output resolution elements being in a plane whereby the light transmitted by columns of said second plurality of resolution elements is integrated, said integrated light providing the matrix transformation output data, and said second anamorphic lens assembly having unity magnification in said second dimension by means of a second pair of first and second spherical lens elements in a holosymmetric configuration and having a multiple demagnification in said first dimension by means of a second plurality of cylindrical lens elements acting in combination with said second pair of like first and second spherical lens elements, and f. photosensitive means responsive to the light of said output resolution elements.

2. An optical information-processing system as in claim 1 wherein the like first and second spherical lens elements of said first and second pairs are spaced apart a distance corresponding to twice their focal lengths, the object and image of each pair being in the focal planes of said first and second spherical lens elements thereof, respectively, said planes corresponding to the plane of said first medium, the plane of said second medium in which the image of the second spherical lens element of said first pair and the object of the first spherical lens element of said second pair coincide, and the plane of said output resolution elements.

3. An optical information-processing system as in claim 2 wherein said first plurality of cylindrical lens elements comprise four cylindrical lens elements; a first cylindrical lens element of relatively short focal length arranged at its focal length from said first medium, a second cylindrical lens element of longer focal length arranged adjacent the first spherical lens element of said first pair, this first adjacent lens combination being spaced from said first cylindrical lens element by a distance equal to the sum of the focal length of the first cylindrical lens element plus the focal length of said first adjacent lens combination, the focal plane of said first adjacent lens combination coinciding with the focal plane of said first spherical lens element, a third cylindrical lens element of relatively short focal length arranged at its focal length from the focal plane of said first spherical lens element, and a fourth cylindrical lens element of longer focal length arranged adjacent said second spherical lens element, this second adjacent lens combination being spaced from said third cylindrical lens element by a distance equal to the sum of the focal length of the third cylindrical lens element plus the focal length of said second adjacent lens combination, said second medium lying in the focal plane of said second adjacent lens combination.

4. An optical information-processing system as in claim 3 wherein said second plurality of cylindrical lens elements comprise four cylindrical lens elements; a first cylindrical lens element of relatively long focal length arranged adjacent the first spherical lens element of said second pair, this third adjacent lens combination being spaced from said second medium by a distance equal to the focal length of said third adjacent lens combination, a second cylindrical lens element of relatively short focal length arranged at its focal length from the focal plane of said third adjacent lens combination, the focal plane thereof coinciding with the focal plane of said first spherical lens element of said second lens pair, a third cylindrical lens element of relatively long focal length arranged adjacent the second spherical lens element of said second pair, this fourth adjacent lens combination being spaced from the focal plane of said first spherical lens element of said second lens pair by a distance equal to the focal length of said fourth adjacent lens combination, a fourth cylindrical lens element of relatively short focal length spaced at its focal length from the focal plane of said fourth adjacent lens combination and at its focal length from said output resolution elements.